(12) United States Patent
Deghel et al.

(10) Patent No.: US 12,471,078 B2
(45) Date of Patent: Nov. 11, 2025

(54) ENHANCED DOWNLINK SEMI PERSISTENT SCHEDULING OPERATION FOR MULTI-TRANSMISSION RECEPTION POINT

(71) Applicant: NOKIA TECHNOLOGIES OY, Espoo (FI)

(72) Inventors: Matha Deghel, Paris (FR); Keeth Saliya Laddu Jayasinghe, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 381 days.

(21) Appl. No.: 18/033,241

(22) PCT Filed: Oct. 22, 2020

(86) PCT No.: PCT/EP2020/079711
§ 371 (c)(1),
(2) Date: Apr. 21, 2023

(87) PCT Pub. No.: WO2022/083863
PCT Pub. Date: Apr. 28, 2022

(65) Prior Publication Data
US 2023/0292303 A1    Sep. 14, 2023

(51) Int. Cl.
*H04W 72/11*    (2023.01)
*H04L 5/00*    (2006.01)
*H04W 72/23*    (2023.01)

(52) U.S. Cl.
CPC .......... *H04W 72/11* (2023.01); *H04L 5/0055* (2013.01); *H04W 72/23* (2023.01)

(58) Field of Classification Search
CPC . H04W 72/11; H04W 72/23; H04W 72/0446; H04L 5/0055; H04L 5/0053; H04L 1/1896; H04L 1/1854
See application file for complete search history.

(56) References Cited

U.S. PATENT DOCUMENTS

| 2019/0261354 A1 | 8/2019 | Fakoorian et al. |
| 2021/0219329 A1* | 7/2021 | Zhou ............... H04L 1/1819 |
| 2023/0156704 A1* | 5/2023 | Wang ............... H04L 1/1861 |
| | | 370/329 |

OTHER PUBLICATIONS

International Search Report and Written Opinion corresponding to International Patent Application No. PCT/EP2020/079711, dated Jul. 13, 2021.

(Continued)

*Primary Examiner* — Kyaw Z Soe
(74) *Attorney, Agent, or Firm* — Lippes Mathias LLP

(57) ABSTRACT

There are provided apparatuses, methods and computer program products. In accordance with an embodiment, there is disclosed a method comprising obtaining from a wireless communication network at least two semi persistent scheduling configurations; obtaining from the wireless communication network an indication which of the at least two semi persistent scheduling configurations is a primary semi persistent scheduling configuration and which is a secondary semi persistent scheduling configuration; monitoring reception of a downlink channel on the primary semi persistent scheduling configuration; decoding a transport block carried on the downlink channel; and examining whether the decoding of the transport block was successful. The method further comprises starting monitoring reception of a downlink channel on the secondary semi persistent scheduling configuration, if the examination indicates an unsuccessful decoding of the transport block.

14 Claims, 8 Drawing Sheets

(56) References Cited

OTHER PUBLICATIONS

Google, Inc., "HARQ enhancement for SPS", 3GPP TSG RAN WG1 #102-e, e-Meeting, Aug. 17-28, 2020, R1-2006899, 2 pages.
Moderator (OPPO), "FL summary #2 for Multi-TRP/Panel Transmission", 3GPP TSG RAN WG1 #101, e-Meeting, May 25, 2020-Jun. 5, 2020, R1-2004719, 35 pages.

* cited by examiner

ENHANCED DOWNLINK SEMI PERSISTENT SCHEDULING OPERATION FOR MULTI-TRANSMISSION RECEPTION POINT

TECHNICAL FIELD

The present invention relates to a method and apparatus for scheduling downlink transmission for multi-transmission reception point operation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR (5$^{th}$ generation New Radio) is a new radio access technology which has been developed by the 3$^{rd}$ generation partnership project (3GPP) for the 5$^{th}$ generation mobile networks. 5G-NR has been specified within 3GPP to be able to coexist with 4G-LTE (Long Term Evolution) within the same spectrum. In 5G systems a mobile communication device, which may also be called as a user equipment (UE), may have several simultaneous downlink semi persistent scheduling (SPS) configurations, which are separately configured and activated, in a context of a multiple of transmission reception points (multi-TRP). Having multiple active SPS configurations at a time may cause that the UE needs to monitor for physical downlink shared channels (PDSCHs) reception on all the PDSCH occasions corresponding to the active SPS configurations, which may be associated to different TRPs and thus potentially different spatial directions, and this may require important processing capability and may have an impact on UE power consumption. Furthermore, having multiple active SPS configurations is costly as corresponding downlink (DL) transmission resources are reserved e.g. at two TRPs for the same UE even if there is no PDSCH transmission.

Therefore, a mechanism to improve the reliability and latency requirements of PDSCH in a multi-TRP context without increasing the complexity at the UE side and the DL control overhead, and also without consuming/reserving lots of transmission resource might be beneficial.

SUMMARY

Some embodiments provide a method and apparatus for scheduling downlink transmission for multi-transmission reception point operation.

Some embodiments are implemented in the context of the 5G communication systems and provide a solution to improve or even guarantee the reliability (and latency) requirements of PDSCH in a multi-TRP context without increasing the complexity at the UE side and the DL control overhead, and also without consuming/reserving lots of transmission resources.

In accordance with an embodiment, the network configures and activates two DL SPS configurations for a UE, namely a primary SPS configuration and a secondary SPS configuration, and the network indicates to the UE which SPS configuration is the primary one and which is the secondary one. The primary SPS configuration can be mapped to one TRP and the secondary SPS configuration can be mapped to another TRP. Then the configurations may be activated.

After activation of the primary and secondary SPS configurations, the UE starts monitoring for PDSCH reception on the primary SPS configuration but does not monitor for PDSCH reception on the secondary SPS configuration.

The user equipment starts monitoring for PDSCH reception also on the secondary SPS configuration if decoding a received PDSCH on the primary SPS configuration is not successful.

If the user equipment supports multi-downlink control information multi-transmission reception point operation (multi-DCI M-TRP), the mapping could be done e.g. by associating the SPS configuration index to a parameter called as CORESETPoolIndex representing the respective TRP. The association may be performed, for example, via a radio resource control (RRC) message or via a medium access control control element (MAC CE).

If the user equipment supports single-downlink control information based multi-transmission reception point operation, including different ultra-reliable low-latency communication (URLLC) schemes, the primary and secondary SPS configurations may not be uniquely associated to a TRP, but the UE shall assume that these linked SPS configurations are related to different TRPs.

For multi-DCI based multi-TRP, separate DCIs may be used initially to activate primary and secondary SPS configurations.

For single-DCI based multi-TRP, in one variant, the DCI (re)activating the primary configuration may be used to indicate/update a state of a transmission configuration indicator (TCI) for the primary configuration as well as the TCI state for the secondary configuration. This could be done by indicating a TCI codepoint pointing to two TCI states. Alternatively, the TCI state of the secondary configuration could be indicated/updated using a (separate) DCI (re)activating the secondary configuration.

According to a first aspect there is provided a user equipment comprising:
  means for obtaining from a wireless communication network at least two semi persistent scheduling configurations;
  means for obtaining from the wireless communication network an indication which of the at least two semi persistent scheduling configurations is a primary semi persistent scheduling configuration and which is a secondary semi persistent scheduling configuration;
  means for monitoring reception of a downlink channel on the primary semi persistent scheduling configuration; and
  means for decoding a transport block carried on the downlink channel;
  means for examining whether the decoding of the transport block was successful;
  means for starting monitoring reception of a downlink channel on the secondary semi persistent scheduling configuration, if the examination indicates an unsuccessful decoding of the transport block.

According to a second aspect there is provided a method comprising:
  obtaining from a wireless communication network at least two semi persistent scheduling configurations;
  obtaining from the wireless communication network an indication which of the at least two semi persistent scheduling configurations is a primary semi persistent scheduling configuration and which is a secondary semi persistent scheduling configuration;

monitoring reception of a downlink channel on the primary semi persistent scheduling configuration;

decoding a transport block carried on the downlink channel; and examining whether the decoding of the transport block was successful;

starting monitoring reception of a downlink channel on the secondary semi persistent scheduling configuration, if the examination indicates an unsuccessful decoding of the transport block.

According to a third aspect there is provided an apparatus comprising at least one processor; and at least one memory including computer program code the at least one memory and the computer program code configured to, with the at least one processor, cause the apparatus to perform at least the following:

obtain from a wireless communication network at least two semi persistent scheduling configurations;

obtain from the wireless communication network an indication which of the at least two semi persistent scheduling configurations is a primary semi persistent scheduling configuration and which is a secondary semi persistent scheduling configuration;

monitor reception of a downlink channel on the primary semi persistent scheduling configuration;

decode a transport block carried on the downlink channel;

examine whether the decoding of the transport block was successful; and start monitoring reception of a downlink channel on the secondary semi persistent scheduling configuration, if the examination indicates an unsuccessful decoding of the transport block.

According to a fourth aspect there is provided an apparatus comprising:

a first circuitry configured to obtain from a wireless communication network at least two semi persistent scheduling configurations;

a second circuitry configured to obtain from the wireless communication network an indication which of the at least two semi persistent scheduling configurations is a primary semi persistent scheduling configuration and which is a secondary semi persistent scheduling configuration;

a third circuitry configured to monitor reception of a downlink channel on the primary semi persistent scheduling configuration;

a fourth circuitry configured to decode a transport block carried on the downlink channel; and a fifth circuitry configured to examine whether the decoding of the transport block was successful;

wherein the third circuitry is further configured to start monitoring reception of a downlink channel on the secondary semi persistent scheduling configuration, if the examination indicates an unsuccessful decoding of the transport block.

According to a fifth aspect there is provided a computer program comprising computer readable program code which, when executed by at least one processor; cause the apparatus to perform at least the following:

obtain from a wireless communication network at least two semi persistent scheduling configurations;

obtain from the wireless communication network an indication which of the at least two semi persistent scheduling configurations is a primary semi persistent scheduling configuration and which is a secondary semi persistent scheduling configuration;

monitor reception of a downlink channel on the primary semi persistent scheduling configuration;

decode a transport block carried on the downlink channel;

examine whether the decoding of the transport block was successful; and start monitoring reception of a downlink channel on the secondary semi persistent scheduling configuration, if the examination indicates an unsuccessful decoding of the transport block.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
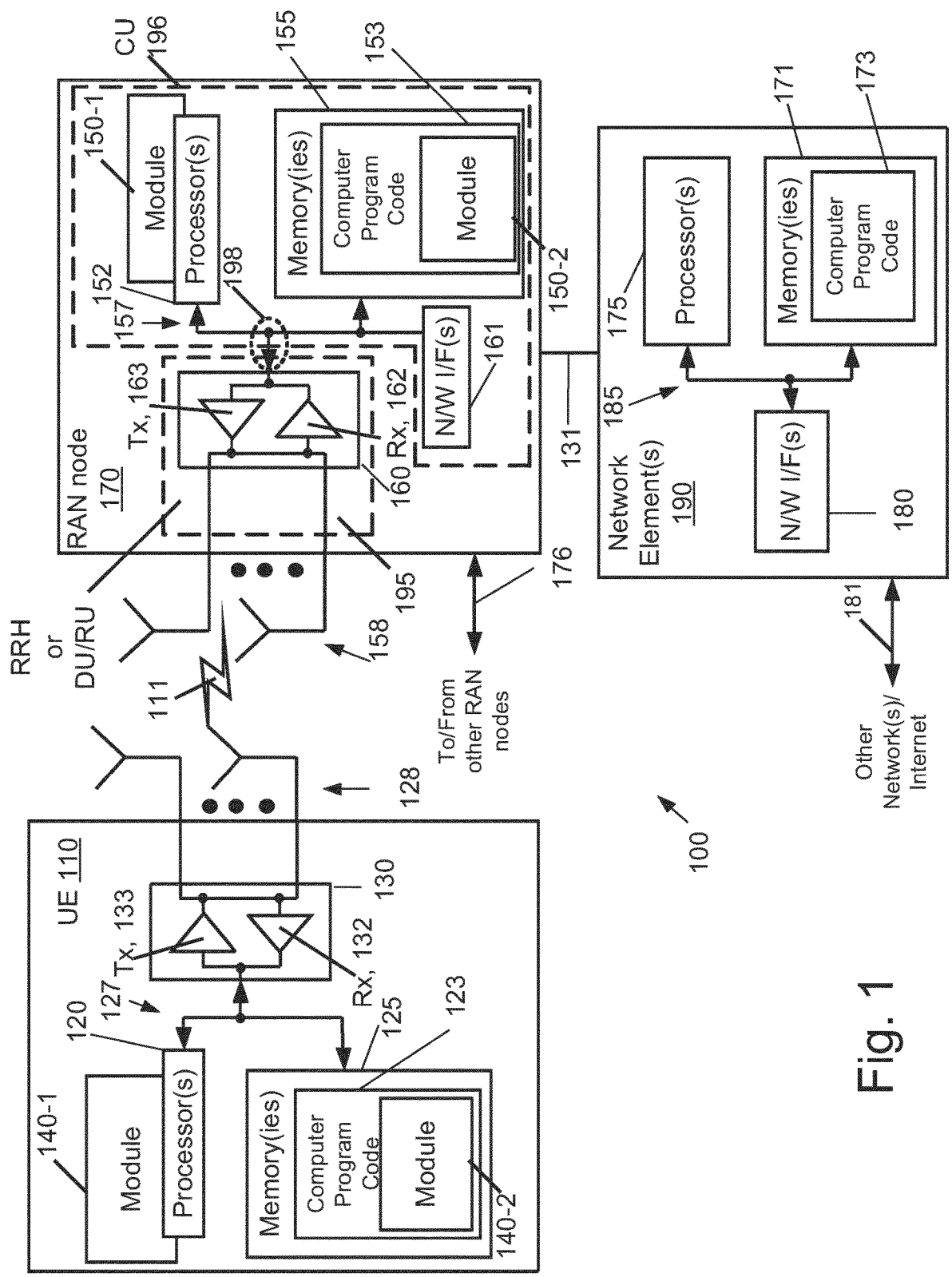
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may also be implemented as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figure 2B:
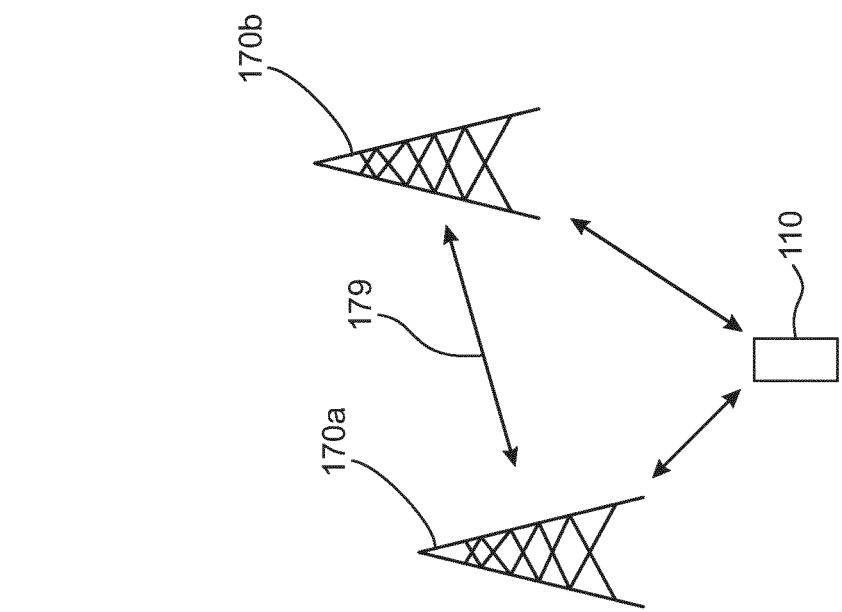
FIG. 2b illustrates a simplified example of a multi-transmission reception point context.
Figure 2A:
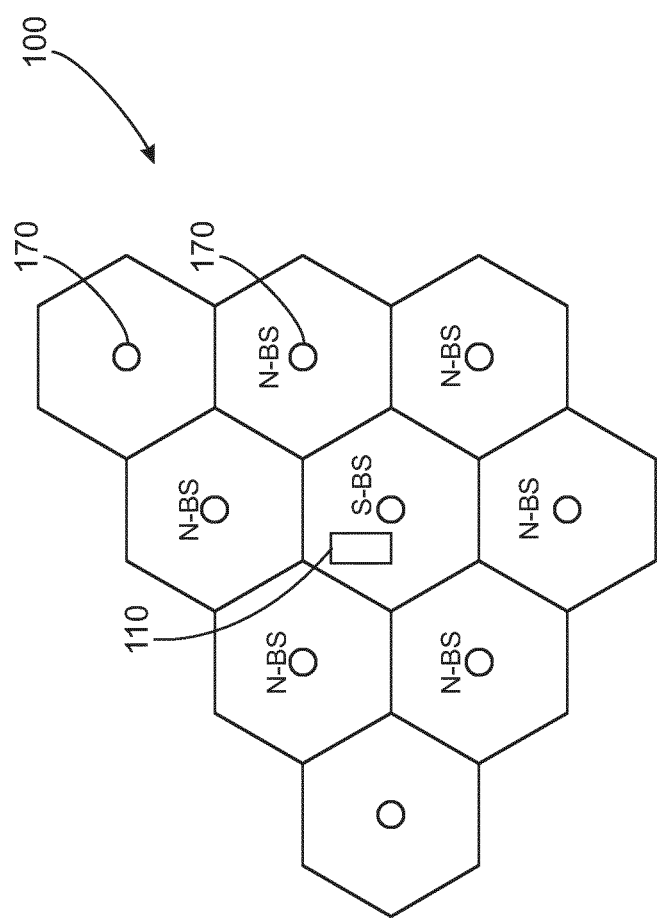
FIG. 2a illustrates a part of a wireless network having several base stations and an exemplary user equipment.

FIG. 2a illustrates a part of a wireless network 100 having several base stations 170 and an exemplary user equipment 110. In FIG. 2a it is assumed that the base station marked as S-BS is the serving base station, when the user equipment is in connected state, and the base station where the user equipment is camped on when not in connected state. Some of the neighbouring base stations are labelled as N-BS in FIG. 2a. In practical situations the serving base station and the camped on base station may change e.g. when the user equipment in moving, or if the signal strength from different base stations changes (e.g. signals from a neighbouring base station N-BS becomes stronger than signals from the currently serving base station.

FIG. 2b illustrates a simplified example of a multi-transmission reception point context. A user equipment 110 may communicate with two or more transmission reception points in a multi-TRP context. In FIG. 2b two transmission reception points are shown: a first transmission reception point 170a and a second transmission reception point 170b. These transmission reception points 170a, 170b may be cells or access points of the wireless communication network. These transmission reception points 170a, 170b may also be able to communicate with each other e.g. via a backhaul connection 179.

Figure 3:
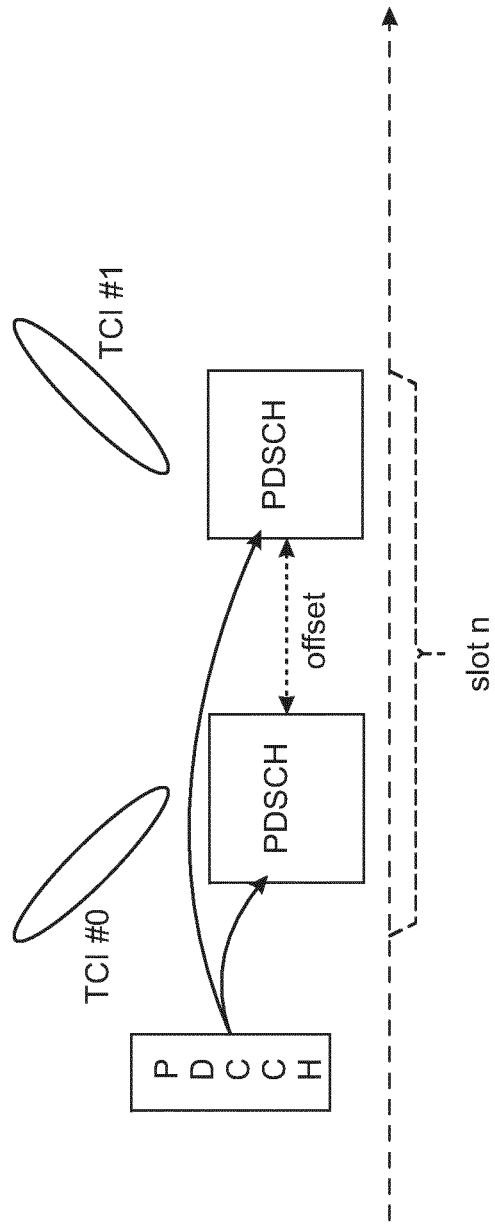
FIG. 3 illustrates an example of a time division multiplexing scheme 3 for ultra-reliable low-latency communication.

FIG. 3 illustrates an example of a time division multiplexing (TDM) scheme 3 for ultra-reliable low-latency communication (URLLC). The physical downlink shared channel (PDSCH) can be repeated over consecutive slots to obtain more diversity gain. Basically, the same transport block (TB) can be transmitted with repetition at more than one transmission occasion from two TRPs with possibly different TCI states. A UE can soft combine the "copies" from different TRPs.

The above multi-TRP enhancements are specified for the cases where the PDSCH is dynamically scheduled, i.e. PDSCH (including all PDSCH transmission occasions) has a corresponding physical downlink control channel (PDCCH).

In accordance with an example the user equipment could have up to 8 simultaneous active downlink semi persistent scheduling (DL SPS) configurations (in a bandwidth part, BWP), which are separately configured and activated, where the periodicity of an SPS configuration is at least 1 slot.

The activation of an SPS configuration is done via PDCCH, and the UE is required to attempt PDSCH detection in each SPS PDSCH occasion and provide a corresponding hybrid automatic repeat request acknowledgement (HARQ-ACK) feedback. It should be noted that this is regardless of whether there is an actual PDSCH transmission or not, as the UE typically does not know if there will be a transmission or not in this case.

The SPS configuration may be established, for example, via radio-resource control (RRC) signaling and may include parameters such as a periodicity, a hybrid automatic repeat request (HARQ) resource on physical uplink control channel (PUCCH), a number of HARQ processes for SPS, etc. The activation may be carried on a PDCCH downlink control information (DCI) scrambled with a configured scheduling radio network temporary identifier (CS-RNTI). The DCI may also include some other parameters of the SPS for the PDSCH. The DCI may e.g. specify frequency domain resources, time domain resources, a modulation and coding scheme (MCS). For the reception of a PDSCH and for its corresponding HARQ-ACK feedback, the user equipment uses the configuration parameters provided via the activating PDCCH and via RRC. It is noted that the term 'reception' may be used herein to imply 'receiving and decoding', i.e. unsuccessful (resp. successful) reception may then mean unsuccessful (resp. successful) decoding.

It should be noted that the DL SPS decreases the downlink control overhead and avoids PDCCH as a source of error compared to dynamically scheduled PDSCHs, which may be important at least from the reliability perspective. Hence, SPS is suitable for several use-cases such as DL-heavy traffic, periodic/TSC traffic, and/or URLLC.

In the following, some embodiments are presented which mainly focus on the problem of how to guarantee the reliability (and latency) requirements of PDSCH in a multi-TRP context without increasing the complexity at the UE side and the DL control overhead, and also without consuming/reserving lots of transmission resources.

Figure 4:
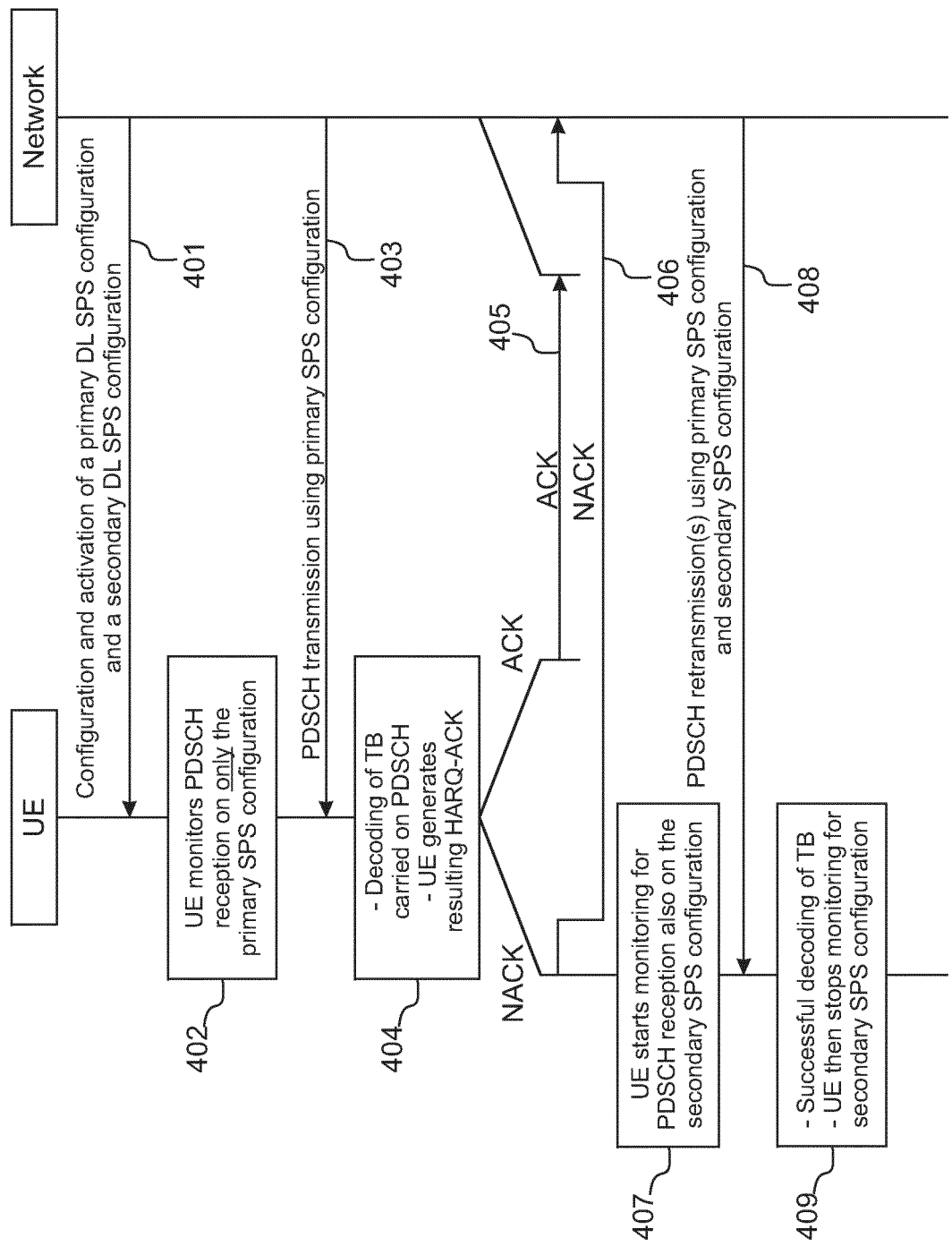
FIG. 4 shows a diagram of operations between a user equipment and a network element in a multi-TRP context, in accordance with an embodiment.
Figure 5A:
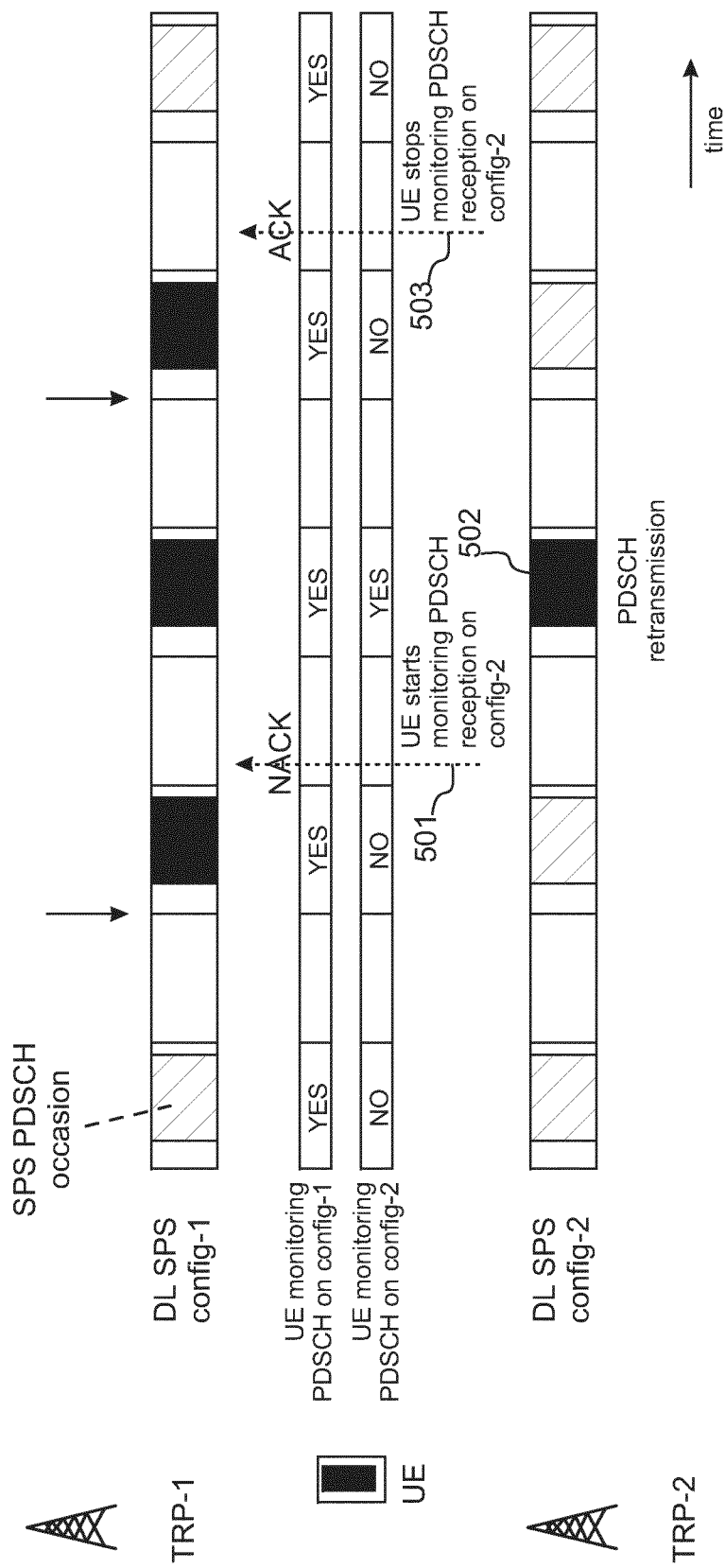
FIG. 5a shows an example of how an embodiment may operate, in accordance with an embodiment.

FIG. 4 depicts some operations between a user equipment and a network element in a multi-TRP context, in accordance with an embodiment. In FIG. 5a, an example of how an embodiment may operate is illustrated. This kind of operation may improve the reliability (and latency) requirements of PDSCH in a multi-TRP context without increasing the complexity at the UE side and the DL control overhead, and also without consuming/reserving lots of transmission resources.

Figure 5B:
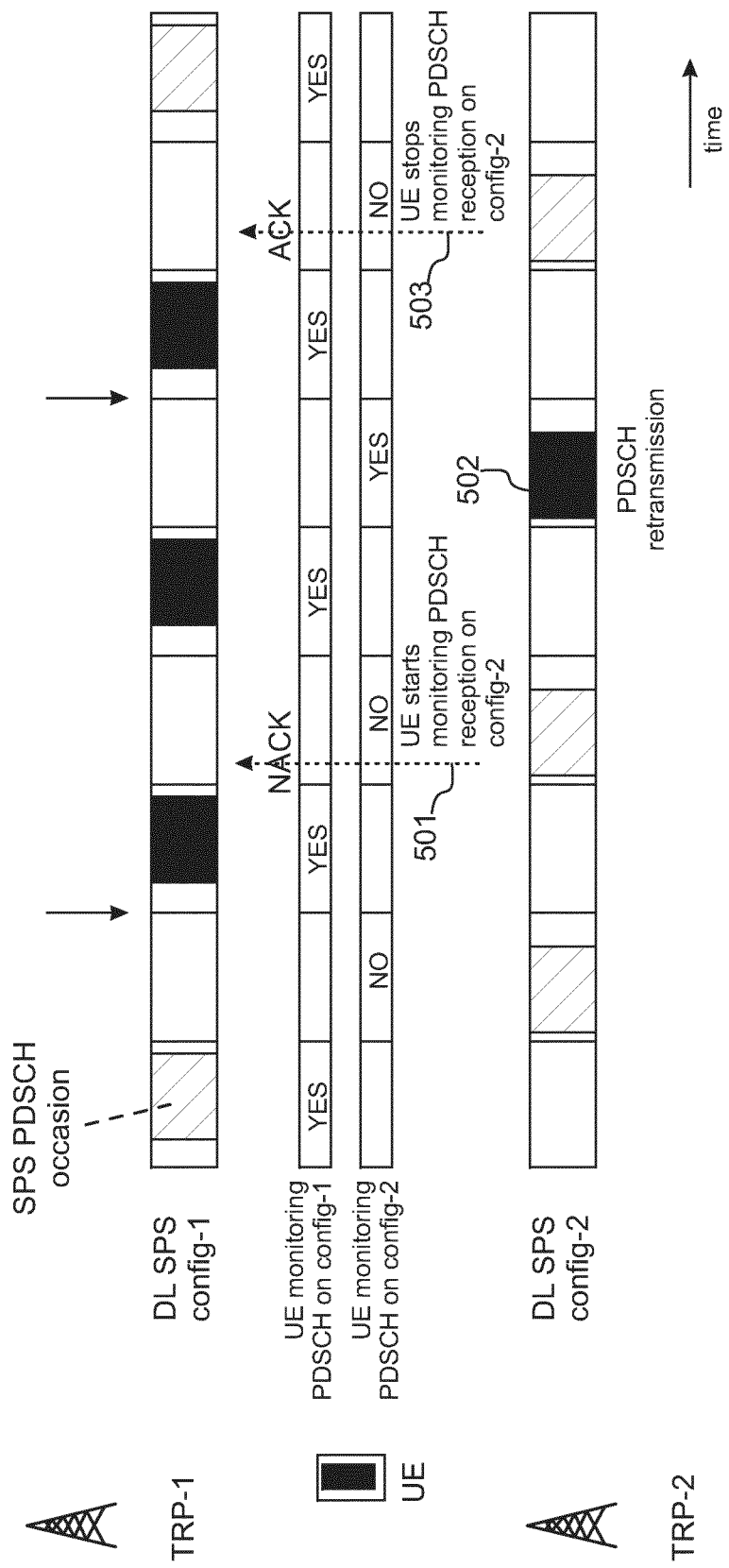
FIG. 5b shows another example of how an embodiment may operate, in accordance with an embodiment.
Figure 6:
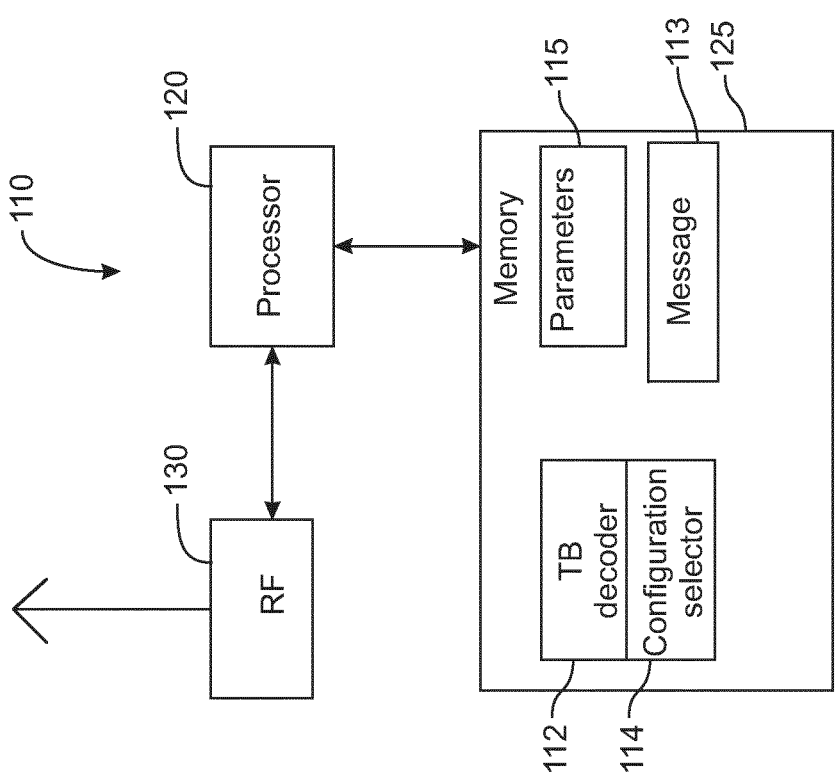
FIG. 6 shows a block diagram of an apparatus in accordance with at least some embodiments.

In the examples of FIGS. 4, 5a and 5b the user equipment has two serving TRPs, namely TRP-1 (e.g. the first TRP 170a in FIG. 2b) and TRP-2 (e.g. the second TRP 170b in FIG. 2b), but the number of TRPs could also be different from that, e.g. three, four or eight TRPs.

The network configures and activates jointly or separately via PDCCH (or even MAC CE) a primary configuration (denoted by config-1) and a secondary configuration (denoted by config-2). This is illustrated with the arrow 401 in FIG. 4. The configuration and activation may be performed via one or both of the TRPs, i.e. via TRP-1 and/or TRP-2, The network informs the UE which configuration is the primary one and which configuration is the secondary one. In other words, each of the two TRPs is associated with a DL SPS configuration, either the primary configuration or the secondary configuration. The two configurations may have PDSCH occasions that overlap in time, either fully or partly; this is e.g. suitable for UEs that could simultaneously receive from more than one TRP. The secondary configuration is a kind of back-up for the primary configuration which may be used for retransmitting TBs that are unsuccessfully received from the primary TRP, i.e. the two configurations can be seen as associated/linked to each other.

For example, the config-1 may be associated to TRP-1 and config-2 to TRP-2. This could be done e.g. by associating (e.g. via RRC or MAC CE) the SPS configuration index to the CORESETPoolIndex representing the respective TRP (for multi-DCI based multi-TRP scenario). Alternatively, in case of a separate activation of the SPS configurations, the association between an SPS PDSCH and a CORESETPoolIndex (for multi-DCI based multi-TRP operation) could be based on the PDCCH used to activate the SPS configuration.

After activation of the primary and secondary SPS configurations, the UE starts monitoring for PDSCH reception on the primary SPS configuration (block 402 in FIG. 4 and the blocks marked with "Yes" in FIG. 5a), i.e. the UE does not monitor for PDSCH reception on the secondary SPS configuration (indicated as the blocks marked with "No" in FIG. 5a).

The UE decodes the transport block carried on the PDSCH and generates an acknowledgement on the basis of whether the decoding succeeded or not (block 403 in FIG. 4).

If the UE did not manage to decode the transport block, the UE sends a negative acknowledgement NACK as a result of unsuccessful decoding of the received PDSCH carrying the transport block (the arrow 406 in FIG. 4). Then the UE starts monitoring for upcoming PDSCH reception(s) also on the secondary SPS configuration (block 407) either on the very next SPS PDSCH occasion or after a certain number of corresponding SPS PDSCH occasions, where the UE expects the same transport block to be retransmitted using the secondary configuration as well as using the primary configuration. This is also illustrated in FIG. 5a with the dotted line 501. Also the blocks appearing after the dotted line in FIG. 5a are provided with the label "Yes" to indicate that the UE monitors traffic on both configurations 1 and 2 i.e. from TRP1 and TRP2. It should be noted that the number of PDSCH retransmissions from each TRP may be greater than or equal to 1, and this number would be configured by the network. In a variant regarding the timing for receiving PDSCH on the secondary SPS configuration, the UE may be configured to monitor/expect the PDSCH retransmission on an SPS PDSCH occasion (of the secondary configuration) not earlier than a configured number of symbols (or slots) after transmitting the NACK feedback.

It should be noted that in case the PDSCHs occasions of the two SPS configurations are fully overlapping, either single frequency network-like (SFN) transmission or spatial division multiplexing-like (SDM) transmission could be adopted.

In accordance with an embodiment, when the UE has started monitoring for PDSCH reception on the secondary SPS configuration, the UE may stop monitoring for PDSCH reception on the secondary SPS configuration after a pre-configured period of time e.g. configured to be a number of SPS PDSCH occasions in time; this number is equal to 1 in the example here. This is also illustrated in FIG. 5a with the dotted line 503. Alternatively, this period could be configured to be a number of symbols (resp. slots/sub-slots) from the ending symbol (resp. slot/sub-slot) of the PUCCH/PUSCH carrying the NACK.

In accordance with an embodiment, when the UE has started monitoring for PDSCH reception on the secondary SPS configuration, the UE may be configured to start monitoring for PDSCH reception on the secondary SPS configuration and to stop monitoring for PDSCH reception on the primary SPS configuration, at least for a certain period of time. In this case, the TB retransmission is done using the secondary configuration.

On the other hand, if the UE managed to decode the transport block, the UE sends a positive acknowledgement ACK as a result of successful decoding of the received PDSCH carrying the transport block (the arrow 405 in FIG. 4). Then the UE keeps monitoring for PDSCH reception on the primary configuration and not monitoring for the secondary configuration.

If the network receives a NACK corresponding to the first transmission of a TB, the network via TRP-1 and TRP-2 and using config-1 and config-2, respectively, retransmits the TB as shown in FIG. 5*a* with the block labelled 502. It should be noted that if the NACK is transmitted towards the primary TRP-1, a cooperation between the primary TRP-1 and the secondary TRP-2 might be needed via the backhaul 179 that has relatively low delays.

If possible, the UE may combine the received copies of a TB.

In a variant to enable soft combining or selection decoding, the UE may monitor both primary and secondary SPS configurations, and the UE may receive SPS PDSCHs from two TRPs prior to respective hybrid automatic repeat request acknowledgement (HARQ-ACK) transmission (assuming shorter SPS periodicities).

In accordance with an embodiment, the UE may be configured whether to send HARQ-ACK feedback for some PDSCH reception(s) on the secondary SPS configuration when monitoring for corresponding SPS occasion or even whether to send HARQ-ACK feedback for the PDSCH retransmission(s) done on the primary SPS configuration. In the example of FIG. 5*a*, the network may indicate/configure the UE to skip the HARQ-ACK feedback of the PDSCH retransmissions on config-1 and/or config-2. In a variant, the network may indicate/configure the UE to generate HARQ-ACK for the (re) activation DCI of the secondary SPS configuration (i.e. to acknowledge the updated SPS parameters, if any) but not for the corresponding SPS PDSCH occasions that are not monitored/decoded by the UE.

The UE may also be configured whether to send joint or separate HARQ-ACK feedback for some PDSCH receptions for the primary and secondary SPS configurations. For instance, in FIG. 5*a*, the network could configure the UE to jointly report the HARQ-ACK feedback for each PDSCH retransmissions done on config-1 and config-2, or alternatively to simply report one feedback (e.g. a single bit) corresponding to whether the TB has been eventually successfully decoded.

It should be highlighted that the SPS PDSCH occasions of the secondary configuration that the UE do not monitor for (for a retransmission of a TB that has been first transmitted using the primary configuration), as a result of the method presented above, could be used by the network for other purposes. Specifically, in FIG. 5*a*, the SPS occasion of the secondary configuration that the TRP-2/network needs to use is the third occasion to help retransmitting the TB that has been unsuccessfully received. The network could e.g. schedule/configure transmissions for other purposes over the other occasions.

As was previously mentioned, in a variant for the example of FIG. 5*a*, the UE may be configured to start monitoring for PDSCH reception on the secondary SPS configuration and to stop monitoring for PDSCH reception on the primary SPS configuration; at least for a certain period of time.

In the example of FIG. 5*b*, another example of a method is illustrated. In this example, the UE has two serving TRPs, each of which is associated with a DL SPS configuration, i.e. a primary configuration and a secondary configuration. In the example here, the two configurations have PDSCH occasions that do not overlap in time; this is e.g. suitable for UEs that could receive from one TRP at a time. This is basically the main difference between the example of FIG. 5*b* and the example of FIG. 5*a*, and similar steps as the one for the previous example could be listed for the example here.

Although the above description focused on the case where there is a single secondary DL SPS configuration that is associated to the primary DL SPS configuration, it may also be possible to associate more than one secondary configuration to the same primary configuration. Also, the same secondary configuration could be associated (i.e. used as back-up configuration) to more than one primary configuration.

In accordance with an embodiment, it is possible that a primary DL SPS configuration is switched to become the secondary configuration and a secondary DL SPS configuration to become the primary configuration.

The above described operations may improve the reliability and/or latency requirements of PDSCH essentially in a multi-TRP context without increasing the complexity at the UE side and the DL control overhead. In addition, this may be achieved without consuming/reserving lots of transmission resources. The solution may therefore be quite suitable and useful for several use-cases such as DL-heavy traffic, periodic/TSC traffic, and/or URLLC.

In accordance with an embodiment, the user equipment 110 may have a transport block decoder 112 which may decode the transport blocks and store them into a message memory 113. The transport block decoder 112 which may be able to provide a flag indicating whether the decoding was successful or not. The user equipment 110 may also have a configuration selector 114 which controls selection of the SPS configuration. For example, the configuration selector 114 may initially select the primary SPS configuration and if the flag reveals unsuccessful decoding, the configuration selector 114 may also select the second SPS configuration as was explained before in this specification. The user equipment 110 may also have a parameter memory 115 for storing parameters and other data related to the operation of the user equipment 110. For example, parameters of the primary and secondary SPS configuration may be stored into the parameter memory 115. It should be noted that the user equipment may also have some further circuitry not mentioned here.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 7:
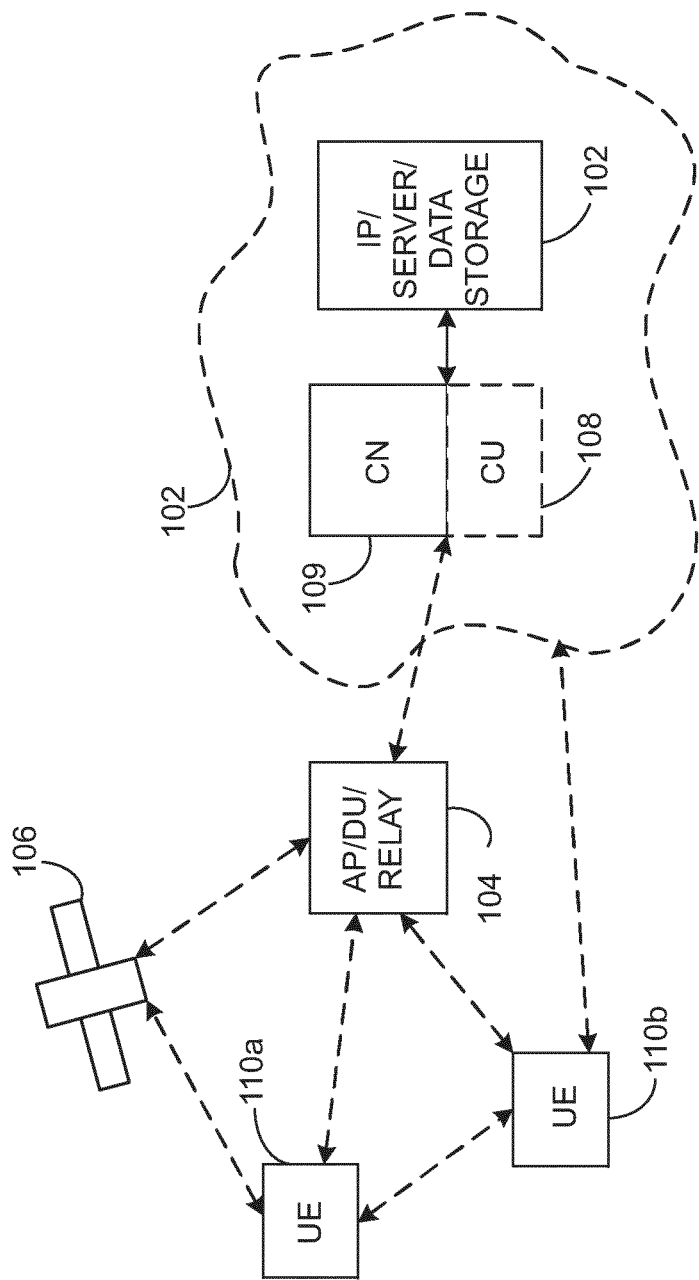
FIG. 7 shows a part of an exemplifying wireless communications access network in accordance with at least some embodiments.

FIG. 7 depicts examples of simplified system architectures only showing some elements and functional entities, all being logical units, whose implementation may differ from what is shown. The connections shown in FIG. 7 are logical connections; the actual physical connections may be different. It is apparent to a person skilled in the art that the system typically comprises also other functions and structures than those shown in FIG. 7.

The embodiments are not, however, restricted to the system given as an example but a person skilled in the art may apply the solution to other communication systems provided with necessary properties.

The example of FIG. 7 shows a part of an exemplifying radio access network.

FIG. 7 shows user equipments 110a and 110b configured to be in a wireless connection on one or more communication channels in a cell with an access node (such as (e/g) NodeB) 104 providing the cell. The physical link from a user equipment to a (e/g) NodeB is called uplink (UL) or reverse link and the physical link from the (e/g) NodeB to the user equipment is called downlink (DL) or forward link. It should be appreciated that (e/g) NodeBs or their functionalities may be implemented by using any node, host, server or access point etc. entity suitable for such a usage.

A communication system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user equipments. The antenna unit may comprise a plurality of antennas or antenna elements. The (e/g) NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 7) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 7 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user equipment may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 7 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 7). A HNB Gateway (HNB-GW), which is typically installed within an operator's network may aggregate traffic from a large number of HNBs back to a core network.

FIG. 9 illustrates an example of a block diagram of an apparatus 110 in accordance with at least some embodiments of the present invention. The apparatus 110 may be, for example, a part of the resource manager. The apparatus 110 comprises a processor 1022, a memory 1024 and a transceiver 1024. The processor is operatively connected to the transceiver for controlling the transceiver. The apparatus may comprise a memory 1026. The memory may be operatively connected to the processor. It should be appreciated that the memory may be a separate memory or included to the processor and/or the transceiver. The memory 1026 may be used to store information, for example, about maximum length, allowed types, default values for some parameters and/or for some other information.

FIG. 9 also illustrates the operational units as a computer code stored in the memory but they may also be implemented using hardware components or as a mixture of computer code and hardware components.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In the following, a list of acronyms used in this specification are provided:
3GPP—3$^{rd}$ Generation Partnership Project
4G-LTE—Long Term Evolution
5G—5$^{th}$ Generation
AMF—Access and Mobility Management Function
eNB—Evolved NodeB
gNB—5G/NR Base Station
BWP—Bandwidth Part
CN—Core Network
CS-RNTI—Configured Scheduling Radio Network Temporary Identifier
CU—Central Unit
CPS—Cyber Physical System
DCI—Downlink Control Information
DL—Downlink
DSP—Digital Signal Processor
DU—Distributed Unit
FDM—Frequency Division Multiplexing
FPGA—Field-programmable gate array
GEO—Geostationary Earth Orbit
HARQ—Hybrid Automatic Repeat Request
HARQ—ACK-HARQ Acknowledgement
HNB-GW—Home Node B Gateway
IMS—Internet Protocol Multimedia Subsystem
IoT—Internet of Things
LEO—Low Earth Orbit
LMC—Location Management Component
LMF—Location Management Function
LTE-A—Long Term Evolution Advanced
M2M—Machine-to-Machine
MAC CE—Medium Access Control Control Element
MANET—Mobile Ad-hoc Network
MCS—Modulation and Coding Scheme M-DCI—multi-DCI
MEC—Multi-Access Edge Computing
MIMO—Multiple Input-Multiple Output
MME—Mobility Management Entity
mMTC—(massive) Machine-type Communications
MPE—Maximum Permissible Exposure
MS—Mobile Station
NFV—Network Function Virtualization
NGC—Next Generation Core
NR—New Radio
PDA—Personal Digital Assistant
PGW—Packet Data Network Gateway
PDCCH—Physical Downlink Control Channel
PDSCH—Physical Downlink Shared Channel
PUCCH—Physical Uplink Control Channel
PUSCH—Physical Uplink Shared Channel
RAN—Radio Access Network
RRC—Radio Resource Control
RRH—Remote Radio Head
RU—Radio Unit
S-DCI—single-DCI
SDM—Spatial Division Multiplexing
SDN—Software Defined Networking
SFN—Single Frequency Network
SGW—Serving Gateway
SIM—Subscriber Identification Module
SMF—Session Management Function
SPS—Semi Persistent Scheduling
TB—Transport Block
TDM—Time Division Multiplexing
TRP—Transmission Reception Point
UCI—Uplink Control Information
UE—User Equipment
UL—Uplink
UMTS—Universal Mobile Telecommunications System
UPF—User Plane Function
URLLC—Ultra-Reliable Low-Latency Communication
eURLLC—Enhanced URLLC
UTRAN—UMTS Radio Access Network
UWB—Ultra Wideband
WCDMA—Wideband Code Division Multiple Access
WiMAX—Worldwide interoperability for Microwave Access The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining from a wireless communication network at least two semi persistent scheduling configurations;
   obtaining from the wireless communication network an indication which of the at least two semi persistent scheduling configurations is a primary semi persistent scheduling configuration and which is a secondary semi persistent scheduling configuration;
   monitoring reception of a downlink channel on the primary semi persistent scheduling configuration;
   decoding a transport block carried on the downlink channel;
   examining whether the decoding of the transport block was successful; and
   starting monitoring reception of a downlink channel on the secondary semi persistent scheduling configuration, if the examination indicates an unsuccessful decoding of the transport block.

2. The method according to claim 1 further comprising:
   continuing monitoring reception of the downlink channel on the primary semi persistent scheduling configuration simultaneously with monitoring reception of the downlink channel on the secondary semi persistent scheduling configuration.

3. The method according to claim 1, further comprising:
   stopping monitoring reception of the downlink channel on the secondary semi persistent scheduling configuration after a predetermined condition is fulfilled.

4. The method according to claim 3, wherein the predetermined condition is at least one of the following:
   a preconfigured period of time;
   a number of semi persistent scheduling physical downlink shared channel occasions in time;
   a number of symbols from an ending symbol.

5. The method according to claim 1, further comprising:
   transmitting an indication whether the decoding of the transport block was successful to the wireless communication network.

6. The method according to claim 1, further comprising:
   decoding a transport block carried on the downlink channel of the secondary configuration after unsuccessful decoding of the transport block on the downlink channel of the primary configuration.

7. The method according to claim 1, wherein starting monitoring the secondary semi persistent scheduling configuration when at least one of the following condition is fulfilled:
   a preconfigured period of time is lapsed from the unsuccessful decoding of the transport block in the primary semi persistent scheduling configuration; or
   after a configured number of symbols or slots after transmitting a negative acknowledgement due to the unsuccessful decoding of the transport block in the primary semi persistent scheduling configuration.

8. An apparatus comprising at least one processor; and at least one memory including computer program code the at least one memory and the computer program code configured to, with the at least one processor, cause the apparatus to perform at least the following:
   obtain from a wireless communication network at least two semi persistent scheduling configurations;
   obtain from the wireless communication network an indication which of the at least two semi persistent scheduling configurations is a primary semi persistent scheduling configuration and which is a secondary semi persistent scheduling configuration;
   monitor reception of a downlink channel on the primary semi persistent scheduling configuration;
   decode a transport block carried on the downlink channel;
   examine whether the decoding of the transport block was successful; and
   start monitoring reception of a downlink channel on the secondary semi persistent scheduling configuration, if the examination indicates an unsuccessful decoding of the transport block.

9. The apparatus according to claim 8, said least one memory including computer program code configured to, with the at least one processor, cause the apparatus to:
   continue monitoring reception of the downlink channel on the primary semi persistent scheduling configuration simultaneously with monitoring reception of the downlink channel on the secondary semi persistent scheduling configuration.

10. The apparatus according to claim 8, said least one memory including computer program code configured to, with the at least one processor, cause the apparatus to:
   stop monitoring reception of the downlink channel on the secondary semi persistent scheduling configuration after a predetermined condition is fulfilled.

11. The apparatus according to claim 10, wherein the predetermined condition is at least one of the following:
   a preconfigured period of time;
   a number of semi persistent scheduling physical downlink shared channel occasions in time;
   a number of symbols from an ending symbol.

12. The apparatus according to claim 8, said least one memory including computer program code configured to, with the at least one processor, cause the apparatus to:
   transmit an indication whether the decoding of the transport block was successful to the wireless communication network.

13. The apparatus according to claim 8, said least one memory including computer program code configured to, with the at least one processor, cause the apparatus to:
   decode a transport block carried on the downlink channel of the secondary configuration after unsuccessful decoding of the transport block on the downlink channel of the primary configuration.

14. The apparatus according to claim 8, said least one memory including computer program code configured to, with the at least one processor, cause the apparatus to start monitoring the secondary semi persistent scheduling configuration when at least one of the following condition is fulfilled:
   a preconfigured period of time is lapsed from the unsuccessful decoding of the transport block in the primary semi persistent scheduling configuration;
   after a configured number of symbols or slots after transmitting a negative acknowledgement due to the unsuccessful decoding of the transport block in the primary semi persistent scheduling configuration.

* * * * *